United States Patent
Kanthasamy et al.

(10) Patent No.: US 9,830,744 B1
(45) Date of Patent: *Nov. 28, 2017

(54) SURFACE MESH GENERATION SYSTEMS AND METHODS

(71) Applicant: MSC.Software Corporation, Newport Beach, CA (US)

(72) Inventors: Kunaseelan Kanthasamy, Irvine, CA (US); Gongdao Chen, Irvine, CA (US)

(73) Assignee: MSC.Software Corporation, Newport Beach, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/635,985

(22) Filed: Mar. 2, 2015

Related U.S. Application Data

(63) Continuation of application No. 13/686,867, filed on Nov. 27, 2012, now Pat. No. 8,970,590.

(51) Int. Cl.
  *G06T 15/00* (2011.01)
  *G06T 17/20* (2006.01)
  *G06T 17/10* (2006.01)

(52) U.S. Cl.
  CPC .............. *G06T 17/20* (2013.01); *G06T 17/10* (2013.01)

(58) Field of Classification Search
  CPC ........................................................ G06T 17/20
  USPC .................................................. 345/423, 473
  See application file for complete search history.

(56) References Cited

U.S. PATENT DOCUMENTS

| | | | |
|---|---|---|---|
| 6,124,864 A | 9/2000 | Madden et al. | |
| 6,831,642 B2 * | 12/2004 | Mech | G06T 17/10 345/420 |
| 7,275,023 B2 | 9/2007 | Chen et al. | |
| 7,612,774 B2 | 9/2009 | Ueda et al. | |
| 8,269,771 B2 | 5/2012 | Oh et al. | |
| 8,970,590 B1 * | 3/2015 | Brennan | G06T 17/20 345/419 |

OTHER PUBLICATIONS

AgathosA,Pratikakisl,PerantonisS,SapidisN,AzariadisP.3Dmesh segmentation methodologiesforCADapplications.Computer-Aided-Design& Applications 2007;4(6):827-41.*

J Wang, D X Gu, Z Y Yu, C B Tan, L S Zhou; A framework for 3D model reconstruction in reverse engineering; Computers & Industrial Engineering, 63 (2012), pp. 1189-1200.*

Lien, Jyh-Ming, and Nancy M. Amato. "Approximate convex decomposition of polyhedra." Proceedings of the 2007 ACM symposium on Solid and physical modeling. ACM, 2007.*

Chuon, Chansophea, and Sumanta Guha. "Volume cost based mesh simplification." Computer Graphics, Imaging and Visualization, 2009. CGIV'09. Sixth International Conference on. IEEE, 2009.*

(Continued)

*Primary Examiner* — Phu K Nguyen
(74) *Attorney, Agent, or Firm* — Foley & Lardner LLP

(57) ABSTRACT

A method for generating a finite element mesh that includes receiving, by a computer system, data regarding a model of a simulated object, categorizing one or more geometric features of the model and dividing the one or more geometric features of the model into surface shapes based on the data regarding the model. The method includes generating a mesh for each surface shape; and interconnecting the generated mesh to form a mesh for the model.

23 Claims, 11 Drawing Sheets

(56) References Cited

OTHER PUBLICATIONS

U.S. Notice of Allowance dated Jan. 15, 2015, from related U.S. Appl. No. 13/686,867.
U.S. Office Action dated Aug. 13, 2014, from related U.S. Appl. No. 13/686,867.

* cited by examiner

SURFACE MESH GENERATION SYSTEMS AND METHODS

This application is a continuation of U.S. application Ser. No. 13/686,867 which was filed on Nov. 27, 2012. The contents of which are fully incorporated herein by reference in its entirety.

BACKGROUND

The present disclosure relates generally to the field of finite element mesh creation. More particularly, the present disclosure relates to systems and methods for forming a finite element mesh based on the geometric features of a model in a computer aided design (CAD) or computer aided engineering (CAE) system. The systems and methods may be used to create, optimize, test, and deploy a high-quality symmetrical and connected mesh that is unique to a particular model.

Many methods for generating a grid or mesh for a model are known, such as multi-block structured/mapped mesh generation, unstructured mesh generation (e.g., paving, QMorph, bubble, etc.), hybrid structured and unstructured mesh generation, face clustering, etc. Such methods may produce a low quality mesh around features of a mechanical body, such as holes, fillets, and chamfers.

SUMMARY

One embodiment of the mesh generation method relates to a method, system or apparatus for generating a finite element mesh that includes receiving, by a computer system, data regarding a model of a simulated object, categorizing one or more geometric features of the model and dividing the one or more geometric features of the model into surface shapes based on the data regarding the model. The method includes generating a mesh for each surface shape; and interconnecting the generated mesh to form a mesh for the model.

Another embodiment for mesh generation includes a computer program product a computer readable storage medium having a computer readable program code embodied. The computer readable program code adapted to be executed on a processor to implement a method for generating a finite element mesh, the method includes receiving data regarding a model of a simulated object, categorizing the one or more geometric features of the model and dividing the one or more geometric features of the model into surface shapes based on the data regarding the model. The method includes generating a mesh for each surface shape; and interconnecting the generated mesh to form a mesh for the model.

Another embodiment for mesh generation includes a means for generating a finite element mesh that includes a means for receiving data regarding a model of a simulated object, a means for categorizing one or more geometric features of the model and a means for dividing the one or more geometric features of the model into surface shapes based on the data regarding the model. This embodiment includes a means for generating a mesh for each surface shape and a means for interconnecting the generated mesh to form a mesh for the model.

It is to be understood that both the foregoing general description and the following detailed description are and explanatory, and are not restrictive of the disclosure as claimed.

BRIEF DESCRIPTION OF THE DRAWINGS

Features, aspects, and advantages of the present disclosure will become apparent from the following description, appended claims, and the accompanying embodiments shown in the drawings, which are briefly described below.

DETAILED DESCRIPTION

Figure 1:
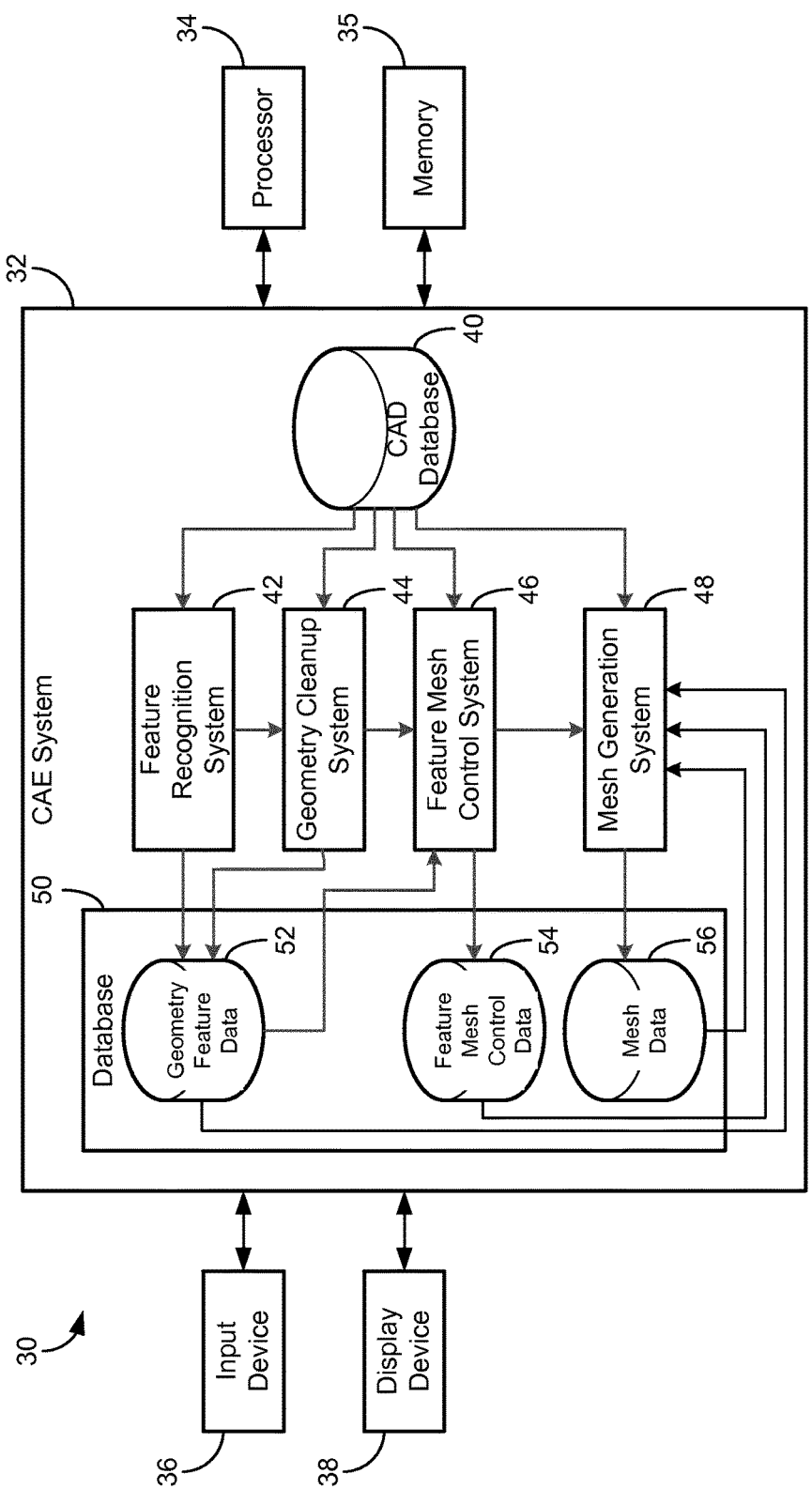
FIG. 1 is a schematic block diagram of a data processing system including a system for use with the systems and methods of the present disclosure, in accordance with an embodiment.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Referring generally to the figures, a procedure and system for creating a finite element mesh for a model in a CAE system is shown and described. More particularly, the systems and procedures for mesh generation are driven by the CAD feature information at each step of the procedure to create a high quality surface mesh that is adapted to the geometry and features of the model.

Most CAD models contain many common engineering features, such as holes, fillets, compound fillets, chamfers, bosses, slots, pockets, etc. Instead of controlling the mesh using low level geometry topologies such as edge/face seeds, the system uses these features to drive the mesh generation where possible by defining an optimum mesh patterns for each of these features and then connecting the feature meshes with other mesh regions according to one embodiment. By generating the mesh specifically to fit the particular features in the model, the checks (e.g., intersection checks, curvature checks, quality checks, etc.) may be greatly reduced or eliminated and the computation requirements and time required to generate the mesh may be reduced according to one embodiment.

The system may utilize a hybrid approach by applying a structured mesh for 4 sided or 3 sided regions/features and apply an unstructured mesh for complex shapes. The system and procedures provide a capability to analyze a model that represents a physical object to be manufactured with multiple features and define multiple named feature meshing rule sets for the creation of a finite element mesh generated from the geometry of the model. For each feature type that is detected, the system and procedures may be utilized to provide a set of rules guidelines to define the target mesh from the geometric feature parameters. The rules or guidelines may be unique to each type of feature, and multiple rules or guidelines may be defined for a single feature type.

The systems and procedures for creating the mesh may generally include a step for loading a model file, a step for recognizing features of the model in the model file, a step for simplifying or otherwise cleaning up (possibly removing) some geometric features of the model in the model file, a step for determining the parameters for the mesh to be generated for the recognized features, a step for meshing the features based on the determined parameters, and a step for meshing the non-features portions of the model.

Referring to FIG. 1, a block diagram of a data processing system 30 is shown according to an embodiment. The system 30 includes a CAE system 32 generally configured to execute the systems and procedures described herein. The system 30 further includes a processor 34, memory 35, an input device 36, and a display device 38. The system 30 may include other devices such as a network system, wireless or wired communications systems, printers, and other electronic devices.

The input device 36 may be or include a computer with a monitor, keyboard, keypad, mouse, joystick, or other input devices performing a similar function. The input device 36 may include a keyboard including alphanumeric and other keys, and may be connected to CAE system 32 for communicating information and command selections to processor 34. The input device 36 may include digitizing graphics tablet, a touch screen interface, or other movement sensing interface that may be combined with, or separated from, the display device 38. The input device 36 may include a cursor control device, such as a mouse, trackball, touch screen, motion sensor, or cursor direction keys, for communicating direction information and command selections to the processor 34 and for controlling cursor movement on the display device 38. The display device 38 may be any type of display (e.g., CRT display, LCD display, etc.) configured to provide a visual output to a user of CAE system 32 and the data processing system 30.

The CAE system 32 may be a computer system in communication with the processor 34, the memory 35, the input device 36, and the display device 38. In one implementation, the CAE system 32 may be stored on a non-transitory storage medium that is at the same location as the input device 36. In another implementation, the CAE system 32 may be located in a different location than the input device 36. For example, the CAE system 32 may communicate with the input device 36 through a network or wirelessly. Accordingly, the CAE system 32 may be a cloud-based system that provides software as a service. In other embodiments, the CAE system 32 may include the processor 34 and the memory 35.

The processor 34 may be configured to receive instructions from the input device 36 and the CAE system 32. For example, the instructions may request the processor 34 to calculate any type of general command or request related to the finite element method. The processor 34 is configured to receive data from and calculate results for each of the systems and logics within the CAE system 32. The processor 34 may be, but is not limited to being, an Intel® designed processor, AMD® designed processor, Apple® designed processor, QUALCOMM® designed processor, or ARM® designed processor.

The memory (or storage device) 35 may include a memory such as a random access memory (RAM) or other dynamic storage devices. In another implementation, the memory 35 may also include non-transitory storage media that is configured to store information regarding a geometric model that is being currently modified or was created in the past. The memory 35 may send or receive data to or from the processor 34 and each of the other systems in system the 30. For example, the memory 35 may be configured to communicate with the input device 36, the CAE system 32, and the display device 38. In one embodiment, the memory 35 may be a remote storage device that stores the CAE system 32 data in a different location than the input device 36 or the CAE system 32. In another embodiment, the memory 35 may be located on the same computer system as the input device 36 and/or the CAE system 32.

Referring more specifically to the CAE system 32, various systems are included that may be executed by the processor 34. The CAE system 32 may be generally configured to execute the finite element method described herein. The CAE system 32 is shown to generally include a CAD database 40 configured to contain CAD model data (e.g., vertex, edge, and surface geometry data; material property data; assembly data; etc.). It should be understood that the CAE system 32 may be configured to execute a finite element method on a wide variety of meshes (e.g., quadrilateral or triangular 2-D surface meshes, 3-D meshes, etc.) to analyze a variety of different scenarios (e.g., dynamic loads, static loads, fatigue, stress, fluid dynamics, etc.) for a variety of different simulation goals (e.g., frequencies, displacements, forces, strength, fatigue, etc.).

The CAE system 32 further includes a feature recognition system 42, a geometry cleanup system 44, a feature mesh control system 46, and a mesh generation system 48. The feature recognition system 42 is configured to receive data from the database 40 to recognize and identify features in the model that may be utilized to cleanup geometry, define mesh control specification, and create the mesh. The geometry cleanup system 44 is configured to simplify the geometry of the model. The feature mesh control system 46 is configured to determine properties for the mesh generated for each of the features identified by the feature recognition system 42. The mesh generation system 48 is configured to generate a mesh for the features of the model as recognized by the feature recognition system 42 and utilizing properties determined by the feature mesh control system 46 stored in a database 50. The database 50 may include several database libraries, including geometric feature data 52, a feature mesh control data 54, and mesh data 56. The mesh generation system 48 is further configured to generate a mesh for the non-feature portions of the model or portions of the model that lack features, such as, curves, turns, bends, holes, etc.

The feature recognition system 42 may use various techniques to analyze the model data to detect or recognize common features to which a mesh generated for the model may be modified to fit such that the resulting mesh is of a higher quality for analysis. In one embodiment, the features may be directly accessed from the CAD database 40 if the features and parameters information is provided for the model being analyzed. A flag or other marker indicates the features. The feature recognition system 42 detects the feature using the indicators.

In another embodiment, the feature recognition system 42 may recognize and categorize features from a model lacking information on particular features (e.g., a boundary representation or b-rep model). For example, if a rounded edge of a model is identified in the CAD database 40 as a fillet with defined properties, the feature recognition system may directly access and utilize these identifications and properties. However, if the rounded edge is simply defined in the CAD database 40 as a rounded surface with properties (e.g., a radius, aspect ratio, etc.) within a predetermined range, the feature recognition system 42 may identify and categorize the rounded edge as a fillet. The feature recognition system 42 may be further configured to allow a user of the system 30 to manually identify features in the CAD model (e.g., in a geometry tree, via a graphical interface, etc.).

According to other embodiments, the feature recognition system 42 is utilized to detect and identify features in the model for which it may prove difficult to generate a finite element mesh using existing mesh generation techniques or around which a mesh generated by an existing mesh generation technique may be of a low quality. Such feature may include, but are not limited to: fillets (e.g., curve fillets, surface/solid fillets, surface/solid rolling fillets, etc.), chamfers (e.g., surface/solid chamfers. surface/solid rolling chamfers, etc.), holes (surface/solid simple holes, surface/solid compound holes, counter bore holes, counter sunk holes, counter drill holes, taper holes, hole chains, etc.), and surfaces (e.g., surface/solid annular regions, surface/solid four sided regions, etc.), for which are the mesh generation is described in more detail below. The feature recognition system 42 may also identify other additional features, such as primitives (e.g., radiuses, planes, spheres, cylinders, blocks, cones, etc.), slots, pockets, grooves, milling features, ribs, hem flanges, cutouts, jogs, dimples, louvers, lancets, bridge stamps, lance features, symmetries, extrudes, revolves, pattern information, measures, boss features, islands and fillets in pockets/slots/grooves, and other user defined features. The feature recognition system 42 may be further configured to detect assembly features, such as flanges for spot welding, matching hole patterns for bolting, vicinity check for contact table setup, and potential weld lines. The feature recognition system 42 may be further configured to detect pattern/instance data, such as mirror symmetry, cyclic symmetry, rotational symmetry, cyclic symmetry, axial symmetry, plane strain symmetry, and patterns/repetitions.

The feature recognition system 42 may define similar CAD features detected in the model as a feature set. For example, a set of fillets with radius in a predetermined range (e.g., between 5 and 10 mm) may be grouped together and defined as a fillet set. Grouping of the features into feature sets may be utilized to more efficiently determine the parameters of the mesh applied to the features and generate the mesh for the model, as described in more detail below.

The geometry cleanup system 44 utilizes identified features to simplify and modify the geometry in order to facilitate the creation of a finite element mesh. The geometry cleanup system 44 may build a computer aided engineering (CAE) topology from the CAD topology using virtual topology operations. For example, the geometry cleanup system 44 may be utilized to merge edges (vertex suppress), split edges, merge faces (edge suppress), and split faces to create a high-quality surface mesh. Edges or faces may be merged or split based on the presence of or lack of features associated with the edges or faces. For example, merge edges/faces operation may be applied to a fillet to create better meshable regions. The geometry cleanup system 44 may further be utilized to simplify the geometry of the model, such as by suppressing all of the holes in the model smaller than a predetermined threshold size. The geometry cleanup system 44 may use automatic and/or interactive procedures to simplify or modify the geometry of the model.

The feature mesh control system 46 specifies the mesh controls in order to mesh the features in a manner to create a high quality mesh that is adapted to the particular feature. The feature mesh control system utilizes model data from the database 40 and simplified model data from the geometry cleanup system 44 to establish a set of rules governing each type of feature or feature set. These rules may be stored in the feature mesh control database 54 and specify the mesh controls for each identified feature. For example, if a fillet or a set of fillets is being meshed, then a rule may determine the number of nodes on the curved and straight sides of the fillet. When a hole feature is being meshed, the a number of layers around the hole may be specified. One or more rules may be preset or preprogrammed in the feature mesh control system 46 or automatically generated by the feature mesh control system 46 (e.g., in relation to other rules, detected geometry, etc.). Additional rules may be created by a user of the CAE system 32, such as a desired nominal mesh size. The system 46 may be configured to prioritize user-created rules over the preset rules. A users may choose to define feature mesh parameters explicitly (e.g., by defining a mesh size or number of nodes) or through selection of a simulation goal (e.g., render time, type of simulation, output resolution, etc.). For example, the feature mesh control system 46 may generate a relatively coarse mesh for a dynamic or static load analysis and may generate a relatively fine mesh for fatigue or stress analysis. The mesh pattern may be optimized for a variety of different simulation goals, such as frequencies, displacements, forces, strength, fatigue, etc.

The rules specified by the feature mesh control system 46 may be utilized to further modify the geometry of the CAD model (e.g., by the geometry cleanup system 44). For example, when the CAD model includes a relatively small holes and the feature mesh control system 46 specifies a rule that results in a relatively fine mesh, the hole may be recognized. A fine, graduated mesh may be generated around the hole with the mesh generation system 48. However, when the feature mesh control system 46 specifies a rule that results in a relatively coarse mesh, the hole may be suppressed such that it is ignored in the generation of the coarse mesh with the mesh generation system 48. In other embodiments, the holes or features may be suppressed because the size of the mesh is too large to mesh the holes or the features correctly.

The feature mesh control system 46 may have different rule sets for different feature sets or groups of features in a single category depending on the properties of the feature. For example, a first rule set may be determined for a first group of features (e.g., fillets with a radius less than 2 mm), a second rule set may be determined for a second group of features (e.g., fillets with a radius between 2 mm and 10 mm), and a third rule set may be determined for a third group of features (e.g., fillets with a radius greater than 10 mm). The rule sets can be inherited. For example, the second rule set may reference all rules in the first rule set. A rule set may inherit some rules from another rule set, but override one or more different parameters.

The rule sets determined by the feature mesh control system 46 may be associated with the top level object of the model being meshed (e.g., as an attribute/property of the root model). The rule sets may be inherited by model children from their parent (e.g., sub-assemblies from the top level assembly, parts from assemblies, etc.). Inherited feature meshing rule sets can be overridden at the different points in the hierarchy of the model, such as at the assembly, sub-assembly and part levels. For example, an assembly in a model may not inherit the top-level meshing rule sets, but may instead have different meshing rule sets. Children of that assembly (e.g., parts contained within the assembly) therefore inherit meshing rule sets from the assembly or may have unique meshing rule sets different than either the assembly or the top level meshing rule sets.

The mesh generation system 48 utilizes the rules established by the feature mesh control system 46. Periodic surfaces (e.g., cylinders, frustums, rings, spheres, semi-spheres, tori, cones, ruled surfaces, springs, and disks) are decomposed in to three or four-sided regions. Each region is then meshed using the mapped/structured mesh as described below. Generation of the mesh may include domain decomposition and structured/mapped mesh generation for three or four sided regions using coons patch or transfinite interpolation. The mesh may be a linear mesh or may be a quadratic mesh. The mesh generation system 48 may generate a mesh for a regular parametric surface or a virtual surface.

Once the identified features in the CAD model are meshed, the mesh generation system 48 may mesh the remainder of the model (e.g., non-feature surfaces (surfaces that lack features) or bodies). The mesh generation system 48 may generate a mesh for the non-feature portions of the model such that the completed mesh is continuous. Meshes with shared edges may therefore be matched and equivalenced automatically. A user may be allowed to "unstitch" or separate edges when coincident, unique nodes are required. The continuous nature of the mesh may be limited at the part level, and separate, non-continuous meshes may be generated for each part in an assembly. A user may manually instruct the mesh generation system 48 to generate a continuous mesh between separate parts or to generate a non-continuous mesh for different portions of a single part.

All user inputs utilized to generate the mesh may be stored by the system 30 such that the user may subsequently edit the user input to update the mesh with new parameters. The system 30 may be configured to store certain user inputs. For example, the system 30 may fail to store each manual modification to elements within an automatically generated mesh. In other embodiments, the system 30 may be configured to store all user inputs including the manual modification to elements within an automatically generated mesh.

The mesh objects may be integrated with the CAD model data and presented in a way that allows a user to more easily identify and edit the mesh objects. For example, the mesh objects may be populated in the CAD model tree (e.g., one mesh object for each body that is automatically meshed). Manually generated elements may be added to a separate mesh object added to the tree. The mesh objects may be shown in the CAD model tree automatically or may be configured to be hidden until the user chooses to be shown the mesh objects.

Figure 2:
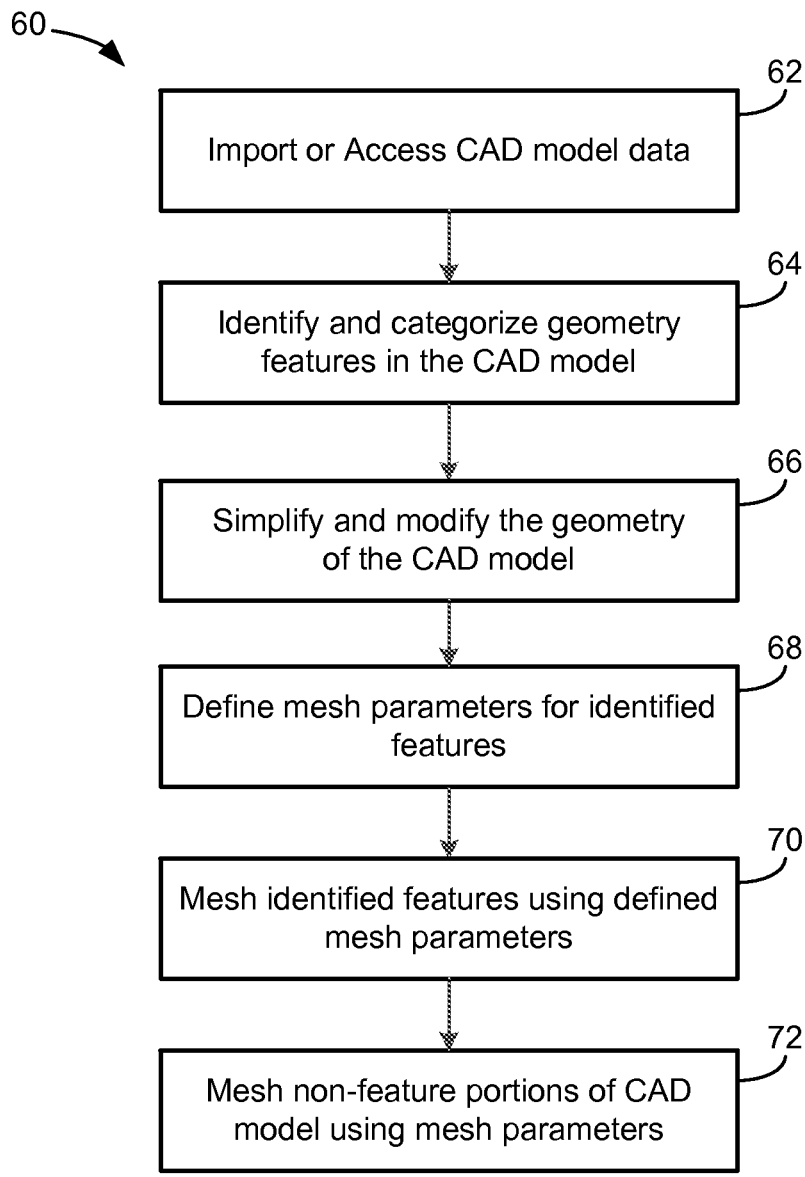
FIG. 2 is flowchart of a process for creating a finite element mesh driven by the features of a model, in accordance with an embodiment.

Referring now to FIG. 2, a flow chart of a process 60 for generating a mesh for an object including one or more identified features is shown. The process 60 may be executed by the CAE system 32. The process 60 includes importing or accessing CAD model data (step 62). Step 62 may be performed by, for example, direct native CAD access or may be performed by a separate import system.

The process 60 further includes identifying and categorizing geometry features in the CAD model (step 64). Step 64 may be performed by, for example, the feature recognition system 42 of FIG. 1, which may access CAD model data from a database 40. The features may be directly accessed from the CAD database 40 utilizing a flag or other marker, allowing them to be detected by the feature recognition system 42. Step 64 may include analyzing the CAD model data and interpreting the model data as features when the features are not identified and flagged. Step 64 may further include grouping together similar features into feature sets. In various embodiments, the surfaces that identified as the same type of feature can be grouped into a feature set, and the features in a feature set may share the same set of mesh control parameters. For an example, all fillets in a model with radii between 5 mmm and 10 mm can be grouped into a feature set which is defined by two elements in the circular direction. In other embodiments, all the fillets with radii between 10 mm to 20 mm can be grouped into another feature set that defines four elements at the circular direction. Several features can be grouped into a composite feature. In other embodiments, a composite feature may comprise more than one feature. For example, a sequence of consecutive 4-sided fillets and corner-fillets can be grouped into a composite feature called rolling fillet. In other embodiments, several closed rolling fillets can be group into a composite feature called "bead". Step 64 may further include grouping together similar features into feature sets.

The features may be identified continuously (e.g., the process 60 may include performing step 64 after any edit is made to the CAD model) or may be identified on demand in response to a command by the user.

The process 60 further includes simplifying and modifying the topology of the CAD model (step 66). Step 66 may be performed, for example, by the geometry cleanup system 44 of FIG. 1. Step 66 may include, but is not limited to such operations as de-featuring or suppressing small features such as holes (e.g., holes with a diameter below a threshold), splitting surfaces or curves to create three or four sided regions, and suppressing vertices and edges (e.g., by merging edges and/or faces). Step 66 is described in more detail below in reference to FIGS. 3A-5B.

The process 60 further includes defining mesh parameters for the identified features (step 68). Step 68 may be performed, for example, by the feature mesh control system 46 of FIG. 1. Mesh parameters may be established for each of the features or feature sets through the determination of a rule set. The rules may be stored in the feature mesh control database 54. Step 68 may include utilizing preset or preprogrammed rules or user-created rules. Step 68 may include establishing a rule set with the top-level object of the model being meshed. Step 68 may further include applying the top-level rule set to all the features in the model, or overriding the top-level rule set for portions of the model.

The process 60 further includes meshing the identified features using defined mesh parameters (step 70). Step 70 may be performed, for example, by the mesh generation system 48 of FIG. 1. Step 70 may include retrieving geometry feature data (e.g., from the geometry feature database 52) and retrieving feature mesh control attribute data (e.g., from the feature mesh control database 54). The data may be input, for example, by API call or by loading the data from a mesh specification xml file. Step 70 is described in more detail below in reference to FIGS. 6A-12C for various features.

The process 60 further includes meshing the non-feature portions of the CAD model using mesh parameters, as defined in step 68 (step 72). Step 72 may be performed, for example, by the mesh generation system 48 of FIG. 1. Step 70 may include retrieving geometry feature data (e.g., from the geometry feature database 52), retrieving feature mesh control attribute data (e.g., from the feature mesh control database 54), and retrieving mesh data (e.g., from the mesh database 56). Step 70 may include "seeding" edges along a path from a feature or other meshed surface or body to generate a compatible mesh for bordering surfaces or bodies.

Figure 3A:
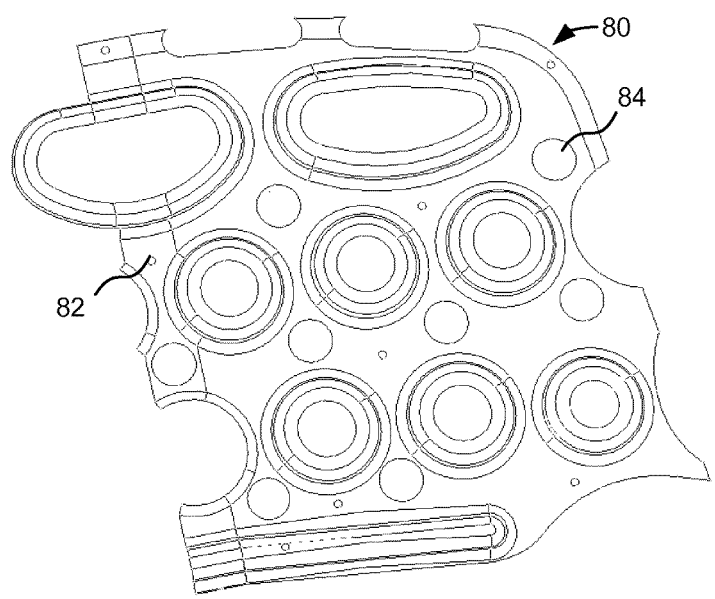
FIG. 3A is a top view of a model for use with the CAE system of FIG. 1.
Figure 3B:
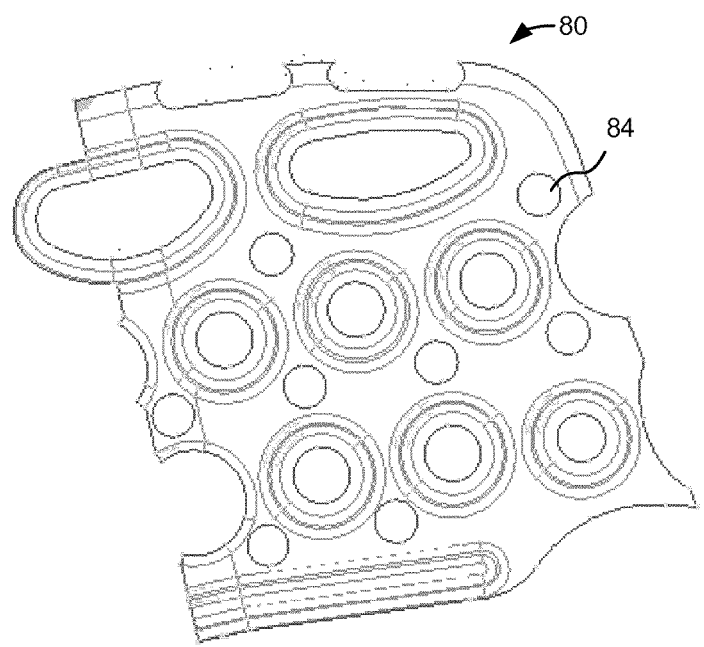
FIG. 3B is a top view of the model of FIG. 3A with select hole features suppressed, in accordance with an embodiment.
Figure 4A:
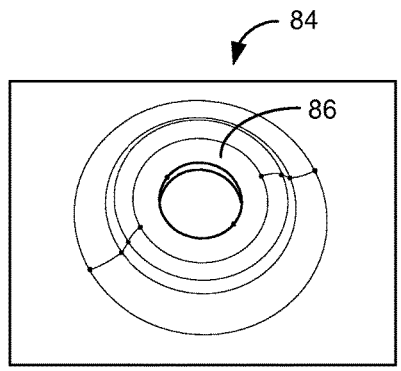
FIG. 4A is an isometric view of a portion of a model for use with the CAE system of FIG. 1.
Figure 4B:
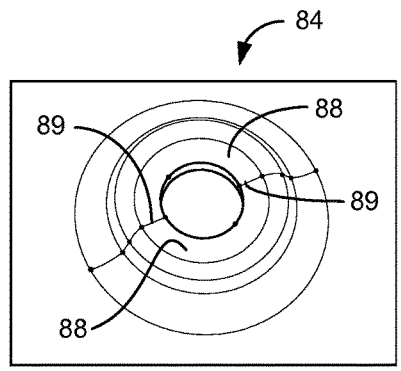
FIG. 4B is an isometric view of the portion of a model of FIG. 4A with a surface split into two 4-side faces, in accordance with an embodiment.
Figure 5A:
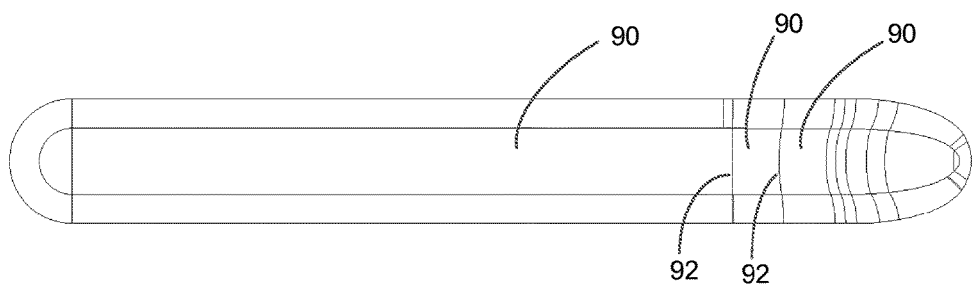
FIG. 5A is a top view of a portion of a model for use with the CAE system of FIG. 1.
Figure 5B:
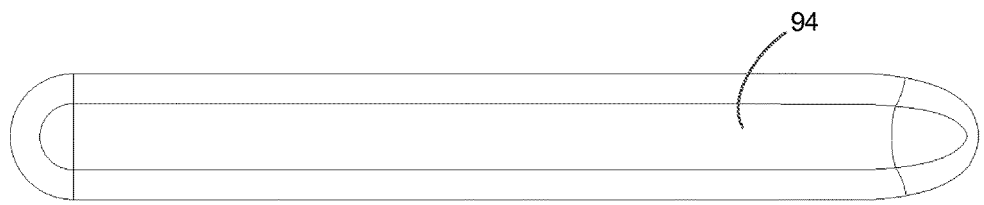
FIG. 5B is a top view of the portion of the model of FIG. 5A with several edges suppressed to merge multiple faces into a single 4-side face, in accordance with an embodiment.

Referring now to FIGS. 3A-5B, several geometry simplification processes, as performed by the geometry cleanup system 44 are shown. As shown in FIG. 3A, a model 80 may include holes 82 and 84 having a plurality of diameters. The geometry cleanup system 44 may compare the diameters of the holes in a model to a threshold diameter. The threshold diameter may be selected by a user, may be a predetermined threshold, or may be determined based on other settings (e.g., a nominal mesh size). As shown in FIG. 3B, the geometry cleanup system 44 may therefore suppress holes 82 with a diameter less than the threshold diameter while leaving holes 84 with a diameter greater than the threshold diameter. As shown in FIG. 4A, the model may include a surface such as an annular surface 86 with only two edges (e.g., around a hole 84). As shown in FIG. 4B, the geometry cleanup system 44 may split the surface 86 into a pair of four-sided surfaces 88 along additional edges 89 to facilitate the creation of a mesh. Moreover, splitting the surface 86 creates square shaped strips 88 that facilitate symmetrical mesh generation. As shown in FIG. 5A, the model may include a region with several related surfaces 90. As shown in FIG. 5B, the geometry cleanup system 44 may suppress the edges 92 between the adjacent surfaces 90 to create a single simplified, merged surface 94.

Figure 6A:
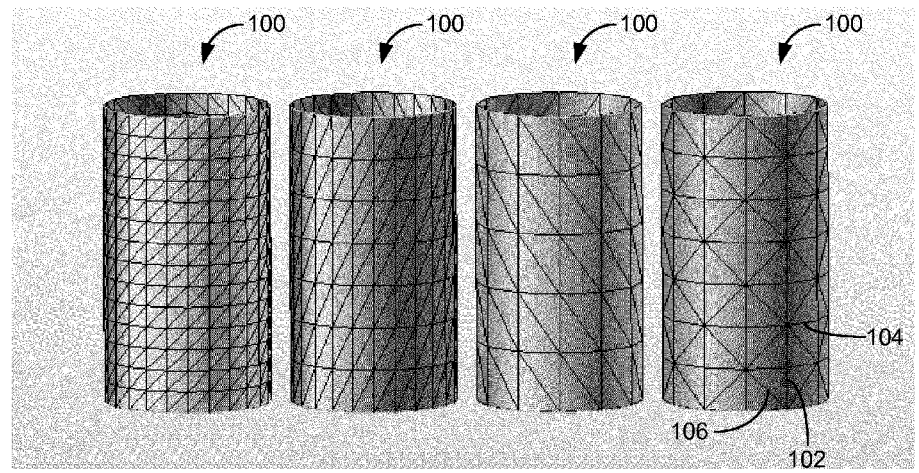
FIGS. 6A-6B are isometric views of several meshed cylinder features, in accordance with an embodiment.
Figure 6B:
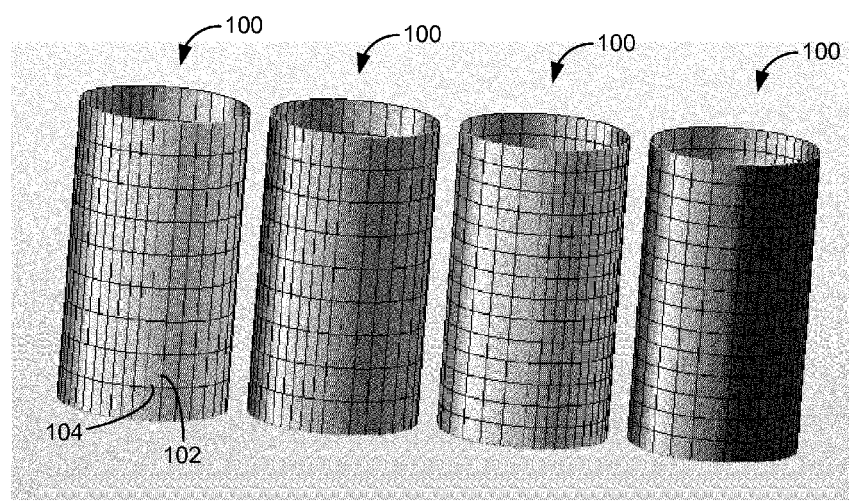

Referring now to FIGS. 6A and 6B, a mesh for a cylinder feature 100 is shown according to a several embodiments. Each cylindrical feature 100 is initially split into two separate semi-cylinder shapes along the outer longitudinal direction. The two shapes of the cylinder at the circumference of the cylinder are four-sided or a rectangular shaped shapes. The mesh for the cylinder 100 may be triangular (see FIG. 6A) or quadrilateral (see FIG. 6B) for 2-D surface meshing, or may be a tetrahedral mesh for 3-D meshing. The mesh includes longitudinal elements 102 and circumferential elements 104. When the mesh is a triangular mesh, it may also include diagonal elements 106 that may be forward diagonal, backward diagonal, or crossed. The feature mesh control system 46 establishes rules for meshing the cylinder 100 including attributes such as axial element size, circular element size, and aspect ratio according to one embodiment. The mesh generated for the cylinder 100 (e.g., by the mesh generation system 48) is optimized to the shape of the cylinder 100 to have a uniform mesh pattern. When the cylinder 100 is a curved feature with end faces that are not parallel to each other, the mesh lines are configured to follow the principle curvature direction of the cylinder 100 according to one embodiment. The mesh may be generated for a conical frustum feature with different radii on top/bottom faces. A similar set of attributes may be used for meshing a semi-cylindrical feature. Each round or odd shape may be split to create a tetrahedral, triangular or square shape for mesh generation purposes.

Figure 7A:
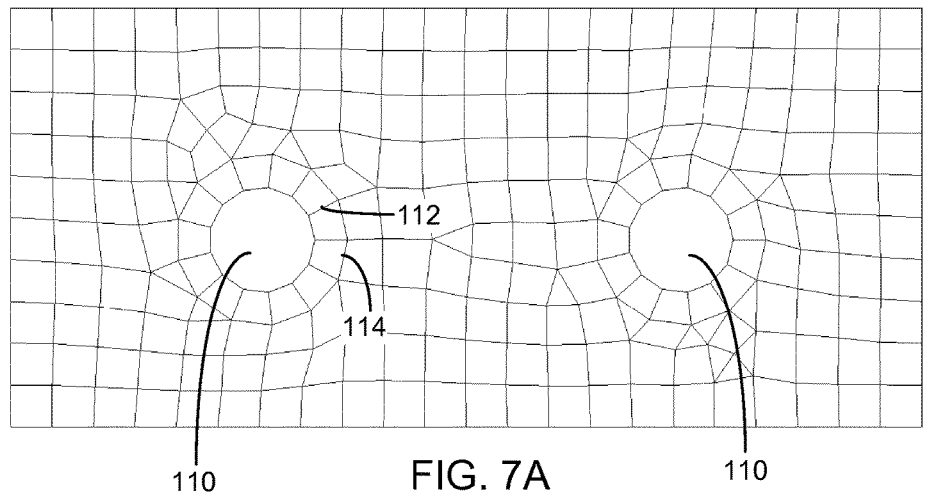
FIGS. 7A-7D are top views of several meshed 2-D hole features, in accordance with an embodiment.
Figure 7B:
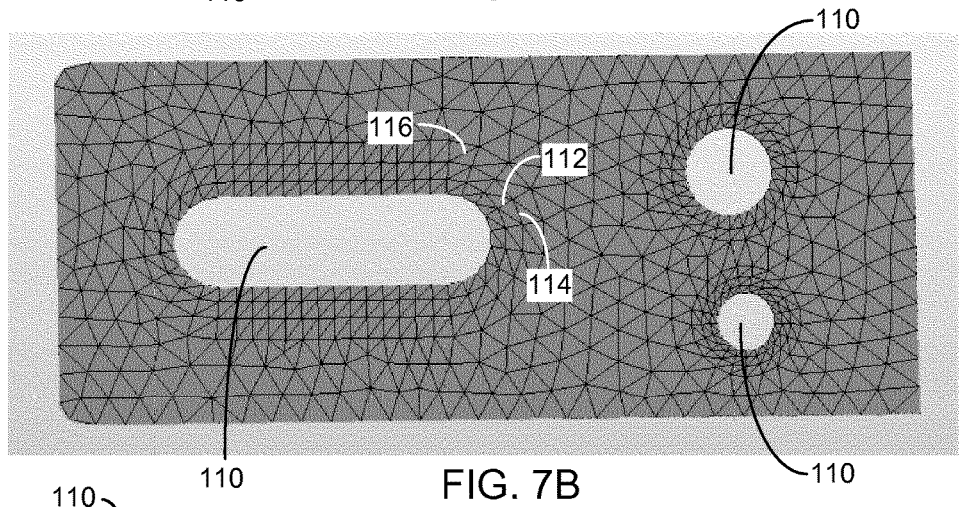
Figure 7C:
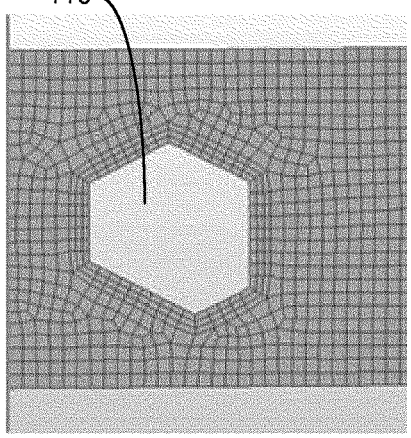
Figure 7D:
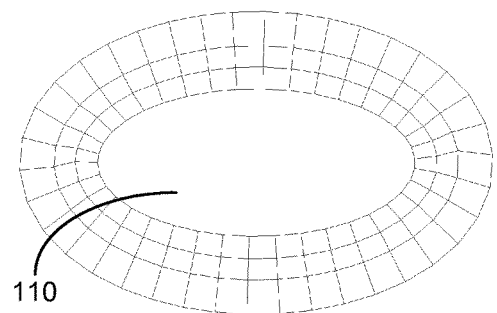

Referring now to FIGS. 7A-7D, a mesh for a 2D hole feature 110 is shown according to several embodiments. The mesh for the hole 110 may be quadrilateral (see FIGS. 7A, 7B, and 7C) or triangular (see FIG. 7B) for 2-D surface meshing, or may be a tetrahedral mesh for 3-D meshing. The hole feature 110 may be a variety of shapes, such as a round hole, a slot (FIG. 7B), a polygonal hole (FIG. 7C) or an ellipsoid hole (FIG. 7D). The mesh includes radial elements 112 that are generally normal to the edge of the hole 110 and circumferential elements 114 that are generally parallel to the edge of the hole and form a series of concentric rings around the hole. A triangular mesh may also include diagonal elements 116. The feature mesh control system 46 establishes rules for meshing the hole 110 including attributes such as the number of elements around the hole 110 (i.e., the maximum angle between element edges), the number of concentric rings of elements, the depth of the first ring of elements, and the ratio of depth of the first ring to depth of the last ring. The rules established by the feature mesh control system 46 may be global rules that are applied to all holes 110 (see FIG. 7A), or may be applied locally, such that each hole 110 is meshed according to unique parameters (see FIG. 7B). In example embodiments, parameters may be determined for choosing elements and creating meshes for FEA problems. The user may choose the mesh size and the density of the mesh that are optimal for the FEA problem (to possibly save computational time). Chosen element types are appropriate for the analysis type performed (for accuracy). Creating a mesh may include element shapes that do not result in near singular stiffness matrices. The chosen elements and meshes can represent force distributions properly. Other choices of parameters that may be changed are aspect ratio, and mesh refinement. In some embodiments, a low aspect ratio may help systems generate a good mesh for various elements. In various embodiments, mesh refinement can be gradual with adjacent elements of similar size. During mesh refinement the accuracy of the solution may be balanced with the size of the problem.

Figure 8:
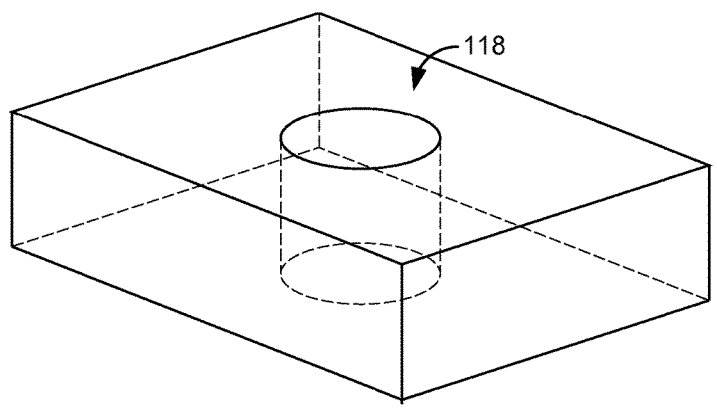
FIG. 8 is an isometric view of a 3-D hole feature, in accordance with an embodiment.

While FIGS. 7A-7D illustrate meshes for a 2-D hole feature 110, similar techniques may be used to generate a mesh for a 3-D through hole feature 118, as shown in FIG. 8. The 3-D through hole 118 is a composite feature that can be represented by a cylinder feature and two 2-D hole features. Mesh control rules can be established by the feature mesh control system 46 and assigned to each individual feature with compatible seeding on the common boundary. In various embodiments, nodes must be placed on lines or planes of symmetry. In 2-D mode, the nodes on the lines of symmetry (LOS) may be constrained to have zero displacements perpendicular to the LOS; no rotational constraints on LOS (in-plane). In 3-D mode, the 3D nodes on the plane of symmetry (POS) may be constrained to have zero displacements out of the POS; no in-plane rotational constraints on POS. Anti-symmetry meshing rules may include nodes that can be placed on the lines or planes of anti-symmetry. 2-D nodes on the lines of antisymmetry (LOAS) may be constrained to have zero translational and rotational displacements along (in-plane) LOAS. Nodes on the plane of anti-symmetry (POAS) must be constrained to have zero in-plane translational and rotational displacements.

Figure 9:
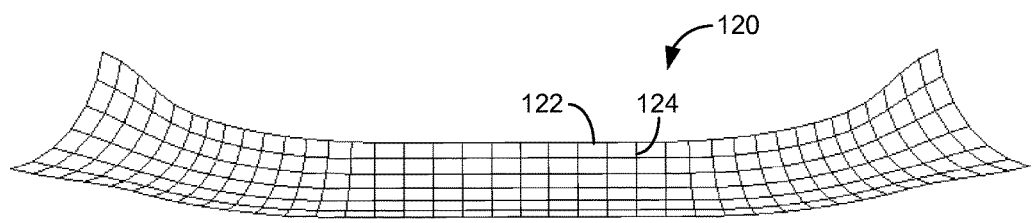
FIG. 9 is a top view of a meshed fillet feature, in accordance with an embodiment.

Referring now to FIG. 9, a mesh for a fillet feature 120 is shown according to an embodiment. The mesh for the fillet 120 may be triangular or quadrilateral for 2-D surface meshing, or may be a tetrahedral mesh for 3-D meshing. The mesh includes longitudinal elements 122 and axial or transverse elements 124. A triangular mesh may include diagonal elements that may be forward diagonal, backward diagonal, or crossed. The feature mesh control system 46 establishes rules for meshing the fillet 120 including attributes such as the length/number of elements 122 in axial direction, the number of elements 124 or the maximum angle between edges on the radius edge, and the aspect ration between the elements 122 and 124.

Figure 10:
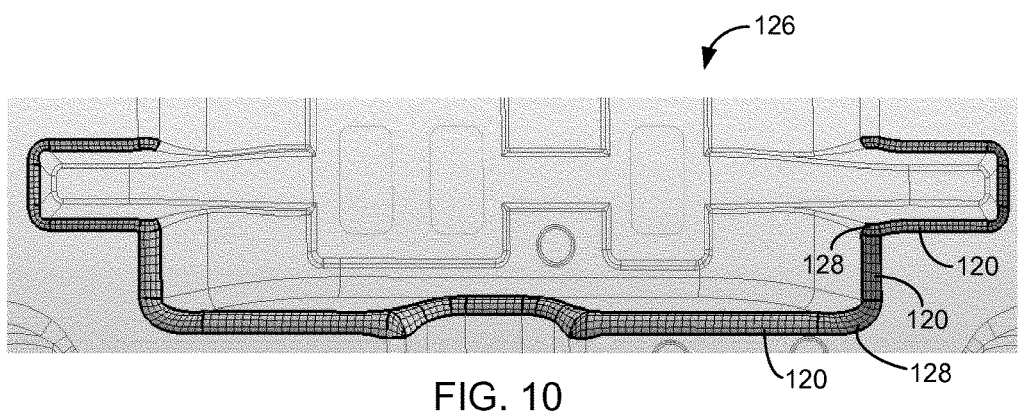
FIG. 10 is a top view of a meshed rolling fillet feature, in accordance with an embodiment.

Referring now to FIG. 10, a mesh for a rolling fillet feature 126 is shown according to an embodiment. The rolling fillet 126 includes a series of fillets 120 joined together by transitional corner fillets 128. Each of the fillets 120 and corner fillets 128 may be meshed as described above. The feature mesh control system 46 may establish rules such that the mesh generation system 48 generates a mesh with the same number of element layers on each fillet 120 and 128 in the set. A continuous mesh is therefore generated for the length of the rolling fillet 126.

Figure 11A:
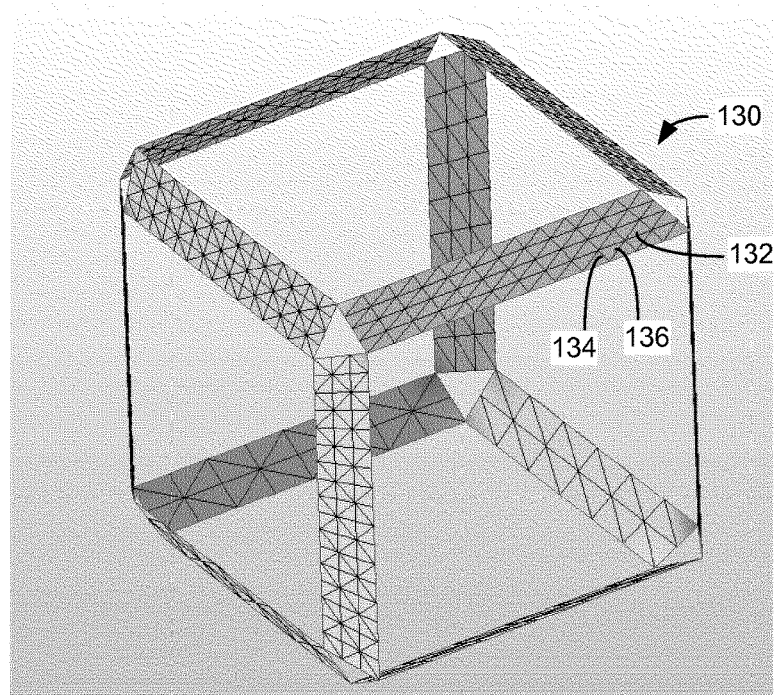
FIG. 11A is an isometric view of a model with several meshed chamfer features, in accordance with an embodiment.
Figure 11B:
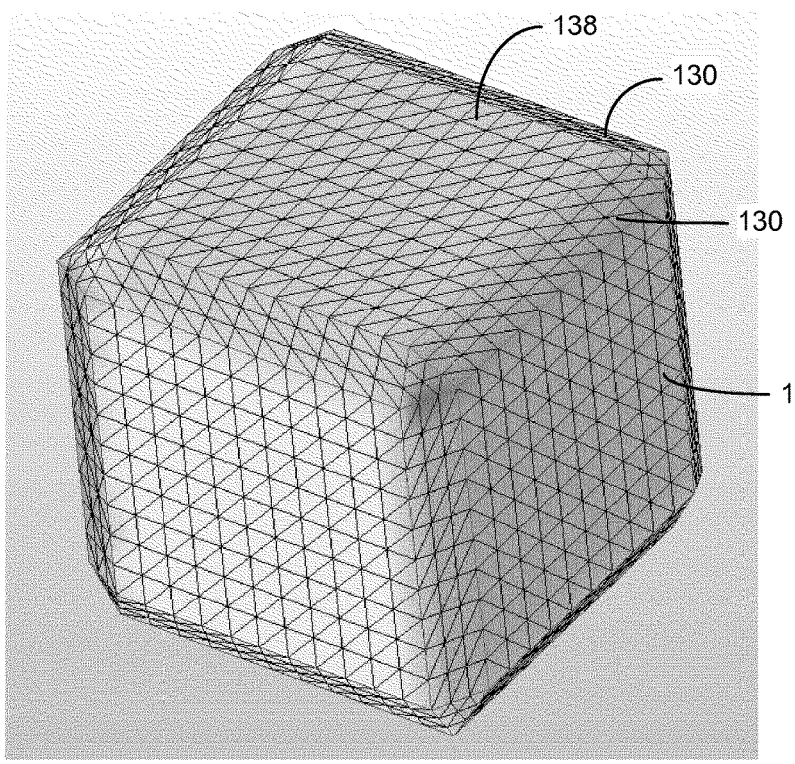
FIG. 11B is an isometric view of the model of FIG. 11A with the mesh extended to the surfaces adjacent the chamfer features, in accordance with an embodiment.

Referring now to FIGS. 11A-11B, a mesh for a chamfer feature 130 is shown according to an embodiment. The mesh for the chamfer 130 may be triangular or quadrilateral for 2-D surface meshing, or may be a tetrahedral mesh for 3-D meshing. The mesh includes longitudinal elements 132 and axial or transverse elements 134. A triangular mesh may also include diagonal elements 136 that may be forward diagonal, backward diagonal, or crossed. The feature mesh control system 46 establishes rules for meshing the chamfer 130 including attributes such as the length/number of elements longitudinal elements 132, the number of transverse elements 134, and the aspect ration between the elements 132 and 134. As shown in FIG. 11B, the rules for the chamfer mesh may be extended to surfaces 138 adjacent to the chamfers 130.

Referring now to FIGS. 11A-11B, a mesh for a chamfer feature 130 is shown according to an embodiment. The mesh for the chamfer 130 may be triangular or quadrilateral for 2-D surface meshing, or may be a tetrahedral mesh for 3-D meshing. The mesh includes longitudinal elements 132 and axial or transverse elements 134. A triangular mesh may also include diagonal elements 136 that may be forward diagonal, backward diagonal, or crossed. The feature mesh control system 46 establishes rules for meshing the chamfer 130 including attributes such as the length/number of elements longitudinal elements 132, the number of transverse elements 134, and the aspect ration between the elements 132 and 134. As shown in FIG. 11B, the rules for the chamfer mesh may be extended to surfaces 138 adjacent to the chamfers 130.

Figure 12A:
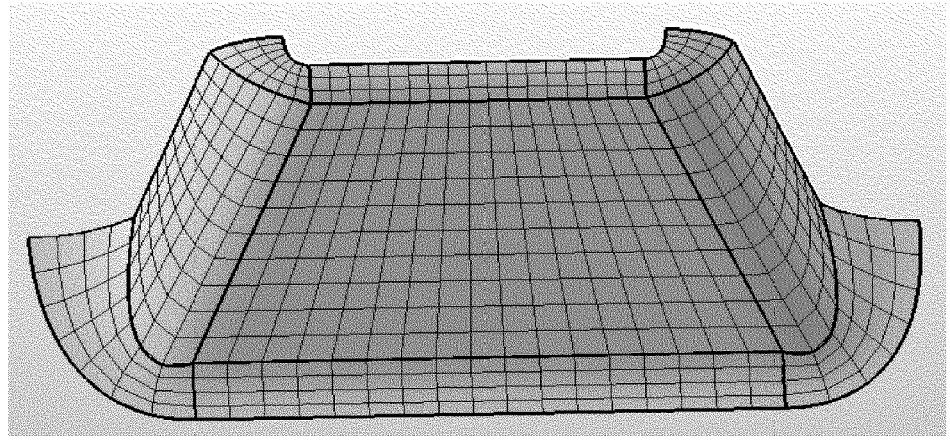
FIGS. 12A-12C are isometric views of several meshed four-sided surfaces, in accordance with an embodiment.
Figure 12B:
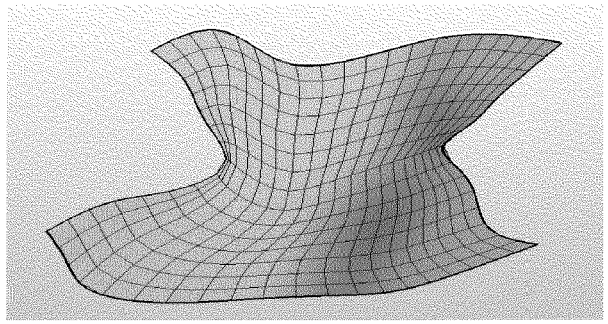
Figure 12C:
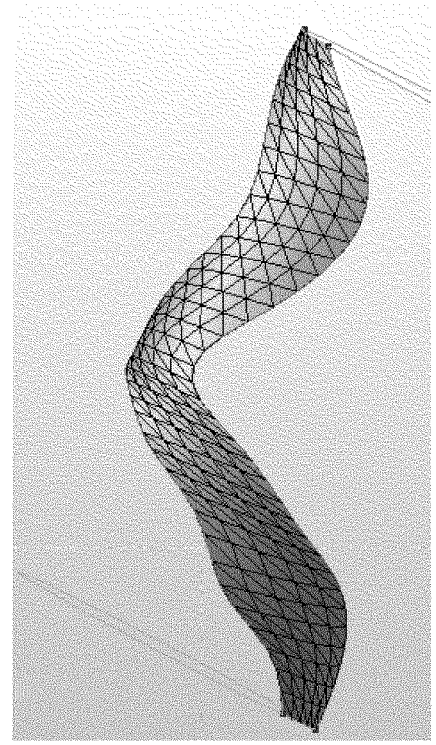

Referring now to FIGS. 12A-12B, a mesh for a four-sided surface 140 is shown according to an embodiment. The mesh for the four-sided surface 140 may be quadrilateral (see FIGS. 12A and 12B) or triangular (see FIG. 12C) for 2-D surface meshing, or may be a tetrahedral mesh for 3-D meshing. A triangular mesh may include diagonal elements may be forward diagonal, backward diagonal, or crossed. As shown in FIGS. 12B and 12C, a mesh may be generated for even highly irregular (e.g., twisted, elongated, pinched, etc.) four-sided surfaces 140.

Figure 13A:
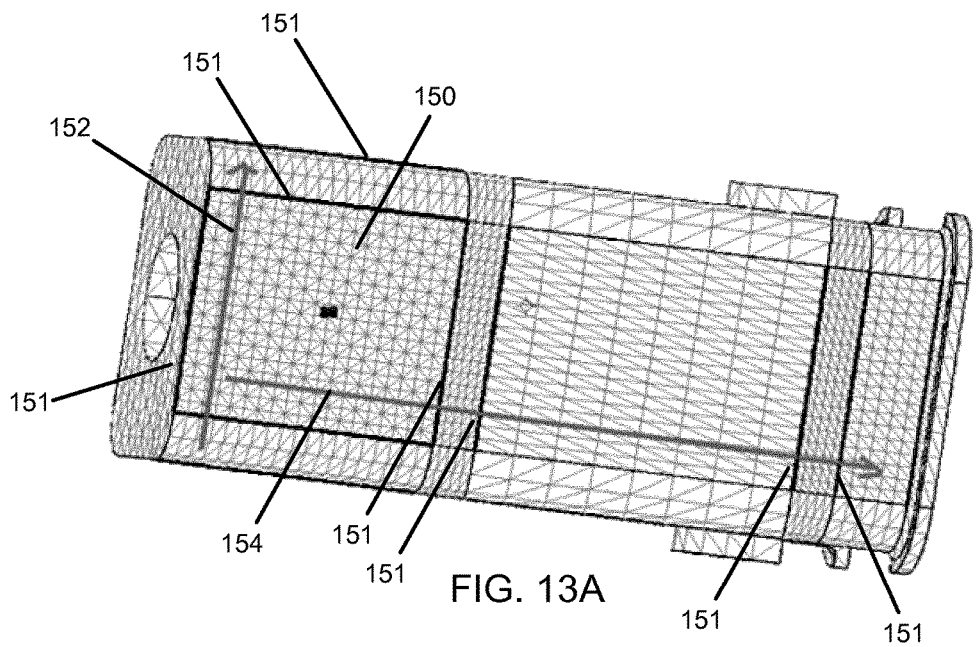
FIG. 13A is an isometric view of a model illustrating an isometric propagation path for the mesh, in accordance with an embodiment.
Figure 13B:
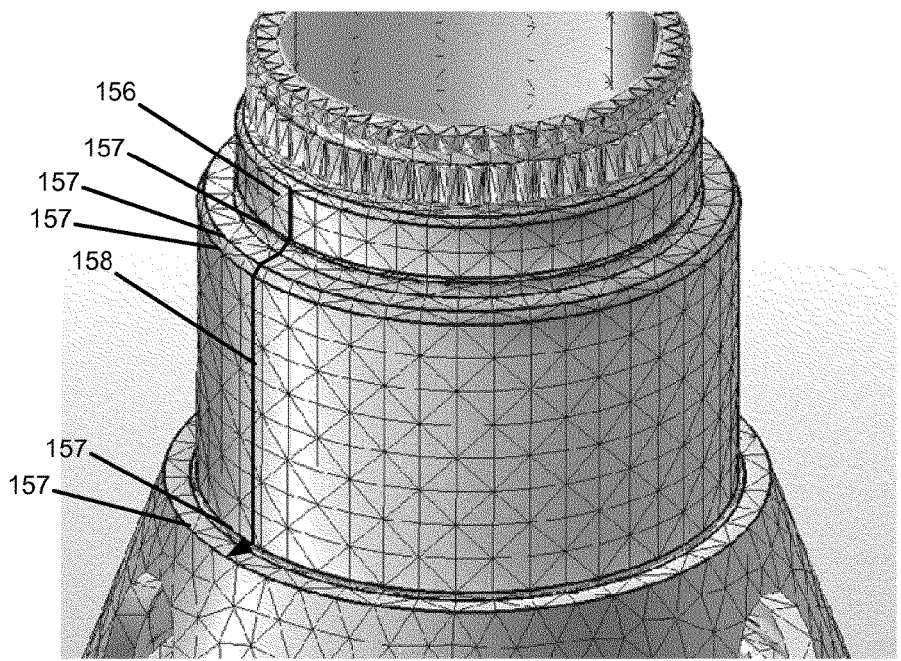
FIG. 13B is an isometric view of a model illustrating a ring propagation path for the mesh, in accordance with an embodiment.

Referring now to FIGS. 13A-13B, the mesh generation system may generate a mesh using an initial or seed surface 150. For a four-sided surface 150, the mesh generation system 48 may create compatible seeding on the edges 151 of other four-sided surfaces along iso paths 152 and 154 extending away from the four-sided surface 150. Similarly, for a cylindrical or ring surface 156, the mesh generation system 48 may create compatible seeding on the edges 157 of other cylindrical or ring surfaces along a ring path 158 extending away from the surface 156.

Figure 14:
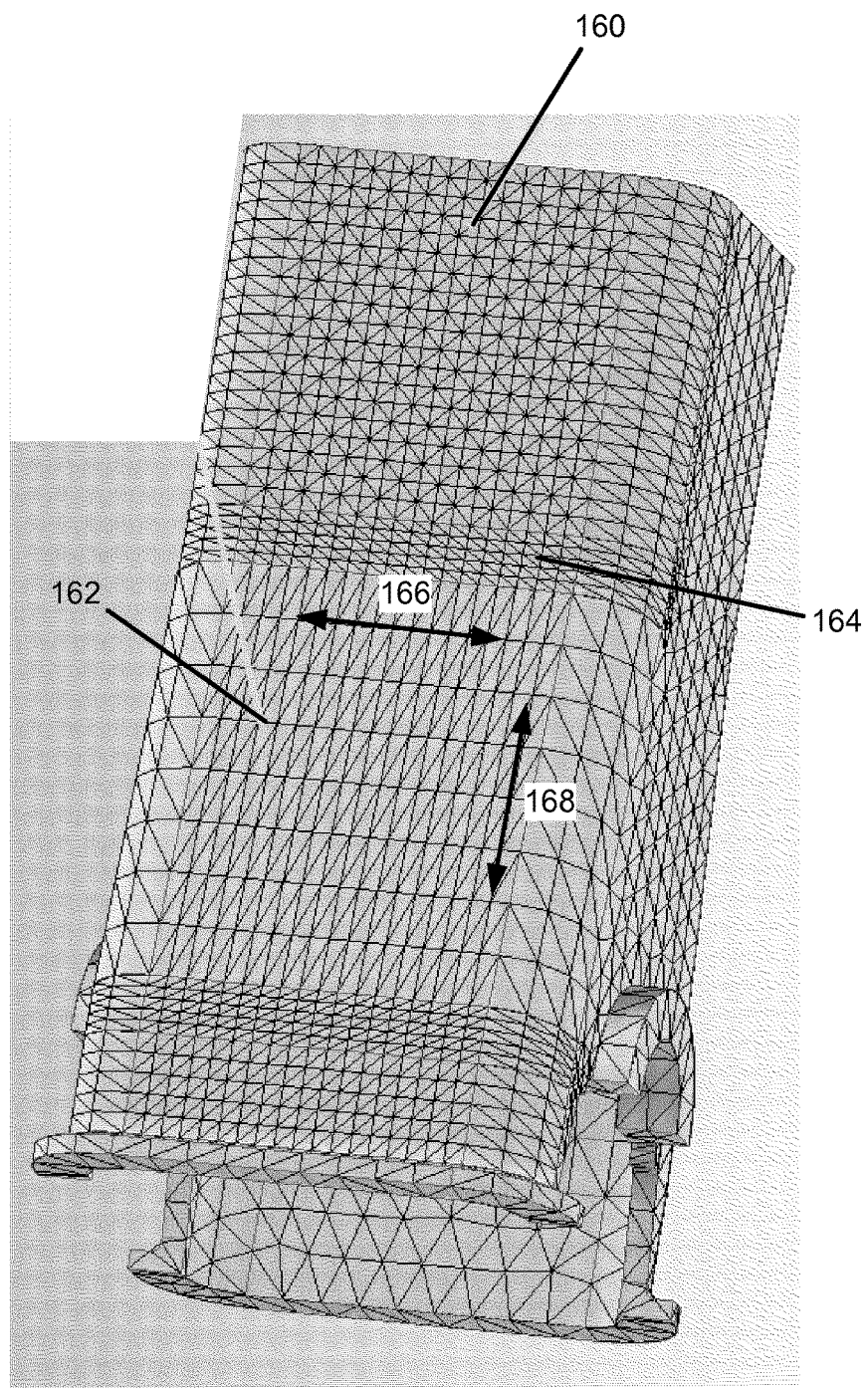
FIG. 14 is an isometric view of a model having adjacent surfaces having differently sized meshes, in accordance with an embodiment.

Referring now to FIG. 14, the rules for meshing the non-feature portions of the model may be may include both hard controls and soft controls. A soft mesh control may be configured to allow the mesh generation system 48 to change the mesh control to match the mesh control on adjacent entities (e.g., the mesh controls for neighboring features as defined by the feature mesh control system 46). A hard mesh control may be configured to force the mesh generation system 48 to respect the hard control. For example, as shown in FIG. 14, a model may include a first surface 160 with a mesh size determined by a hard control and a second surface 162 with a mesh size determined by a soft control. The first surface 160 may directly border the second surface 162 or they may be connected via an intermediate surface or feature 164. The hard control may therefore partially override the soft control and the second surface 162 may be meshed with an element spacing equal to the element spacing of the first surface 160 in the direction 166 parallel to their shared edge. The element spacing in the direction 168 perpendicular to the shared edge may follow the soft control for the second surface 162.

The terms "system", "logic", "data processing apparatus" or "computing device" encompasses all kinds of circuits, apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, networked systems or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable, nontransitory storage media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. The machine-executable instructions may be executed on any type of computing device (e.g., computer, laptop, etc.) or may be embedded on any type of electronic device (e.g., a portable storage device such as a flash drive, etc.).

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure.

Likewise, software implementations could be accomplished with standard programming techniques with rule based logic and other logic to accomplish the various connection steps, processing steps, comparison steps and decision steps.

What is claimed is:

1. A method for generating a finite element mesh, comprising:
   categorizing, by the computer system, geometric features of a model;
   defining mesh parameters for each of the geometric features of the model; and
   generating the finite element mesh for the model by interconnecting the geometric features of the model based on the mesh parameters.

2. The method of claim 1, further comprising receiving, by the computer system, data regarding the model of a simulated object.

3. The method of claim 1, wherein categorizing the one or more geometric features comprises identifying the one or more geometric features based on a marker associated with each of the one or more geometric features.

4. The method of claim 1, wherein categorizing the one or more geometric features comprises analyzing at least one of the one or more geometric features of the model when the at least one of the one or more geometric features of the model is unmarked with a marker.

5. The method of claim 1, wherein defining the mesh parameters for each of the one or more geometric features comprises grouping two or more of the one or more geometric features into a feature set.

6. The method of claim 5, wherein each element in the feature set shares a same set of mesh parameters.

7. The method of claim 1, wherein defining the mesh parameters for each of the one or more geometric features comprises grouping two or more of the one or more geometric features into a composite feature.

8. The method of claim 1, wherein defining the mesh parameters for each of the one or more geometric features comprises determining the mesh parameters for each of the one or more geometric features based on a set of predetermined rules.

9. The method of claim 1, wherein defining the mesh parameters for each of the one or more geometric features comprises retrieving the mesh parameters for each of the one or more geometric features from a database.

10. The method of claim 1, wherein interconnecting the one or more geometric features of the model based on the mesh parameters comprises connecting at least one of the one or more geometric features with a non-feature portion of the model.

11. The method of claim 1, further comprising meshing a non-feature portion of the model using the mesh parameters defined for each of the one or more geometric features.

12. The method of claim 1, wherein the model is a Computer Aided Design (CAD) model comprising the geometric features.

13. A non-transitory computer readable storage medium having a computer readable program code embodied therein, said computer readable program code adapted to be executed on a processor to implement a method for generating a finite element mesh, said method comprising:
   categorizing, by the computer system, geometric features of a model;
   defining mesh parameters for each of the geometric features of the model; and
   generating the finite element mesh for the model by interconnecting the geometric features of the model based on the mesh parameters.

14. The method of claim 13, further comprising receiving, by the computer system, data regarding the model of a simulated object.

15. The method of claim 13, further comprising receiving, by the computer system, data regarding the model of a simulated object.

16. The method of claim 13, wherein categorizing the one or more geometric features comprises identifying the one or more geometric features based on a marker associated with each of the one or more geometric features.

17. The method of claim 13, wherein categorizing the one or more geometric features comprises analyzing at least one of the one or more geometric features of the model when the at least one of the one or more geometric features of the model is unmarked with a marker.

18. The method of claim 13, wherein defining the mesh parameters for each of the one or more geometric features comprises grouping two or more of the one or more geometric features into a feature set.

19. The method of claim 18, wherein each element in the feature set shares a same set of mesh parameters.

20. The method of claim 13, wherein defining the mesh parameters for each of the one or more geometric features comprises grouping two or more of the one or more geometric features into a composite feature.

21. The method of claim 13, wherein defining the mesh parameters for each of the one or more geometric features comprises determining the mesh parameters for each of the one or more geometric features based on a set of predetermined rules.

22. The method of claim 13, wherein defining the mesh parameters for each of the one or more geometric features comprises retrieving the mesh parameters for each of the one or more geometric features from a database.

23. An apparatus for generating a finite element mesh, comprising:
   means categorizing geometric features of a model;
   means for defining mesh parameters for each of the geometric features of the model; and
   means for generating the finite element mesh for the model by interconnecting the geometric features of the model based on the mesh parameters.

* * * * *